United States Patent [19]
Ashjaee

[11] Patent Number: 5,769,370
[45] Date of Patent: Jun. 23, 1998

[54] KNOCK-DOWN SATELLITE POSITIONING SYSTEM ANTENNA SUPPORTING TRIPOD

[75] Inventor: Javad Ashjaee, Saratoga, Calif.

[73] Assignee: Javad Positioning, LLC, Saratoga, Calif.

[21] Appl. No.: 647,472

[22] Filed: May 8, 1996

Related U.S. Application Data

[63] Continuation-in-part of Ser. No. 578,169, Dec. 29, 1995.
[51] Int. Cl.$^6$ .................................................. F16M 11/14
[52] U.S. Cl. ........................................ 248/181.1; 248/168
[58] Field of Search ................................ 248/168, 163.1, 248/181.1, 523; 33/262, 293; 342/335, 357; 356/3.12, 139.05; 343/894, 880, 881, 882, 883

[56] References Cited

U.S. PATENT DOCUMENTS

| | | | |
|---|---|---|---|
| 209,562 | 11/1878 | Gurley | 248/181.1 |
| 3,262,321 | 7/1966 | Moul, Jr. | 343/765 |
| 4,244,547 | 1/1981 | Kooi | 248/180 |
| 4,317,552 | 3/1982 | Weidler | 248/168 |
| 4,339,880 | 7/1982 | Hall | 33/293 |
| 4,438,896 | 3/1984 | Hall | 248/523 |
| 4,767,090 | 8/1988 | Hartman et al. | 248/168 |
| 5,249,766 | 10/1993 | Vogt | 248/181 |
| 5,435,509 | 7/1995 | Bingham | 248/159 |
| 5,614,918 | 3/1997 | Dinardo et al. | 343/882 |

*Primary Examiner*—Ramon O. Ramirez
*Assistant Examiner*—Gwendolyn W. Baxter
*Attorney, Agent, or Firm*—Coudert Brothers

[57] ABSTRACT

A knocked-down portable geodetic surveying station in kit form is disclosed which utilizes a GPS antenna attached to the top portion of a surveyor's stake, or other type monopole. By positioning the bottom portion of the monopole directly upon a desired ground location, and adjusting the angular position of the monopole so that it is precisely vertical, the GPS antenna may be quickly and accurately positioned level and directly above the desired ground location. The GPS antenna and monopole are designed to be used in conjunction with a newly designed geodetic surveying tripod which can be quickly and conveniently set up to support the monopole in its vertical position directly above the desired ground location. The tripod of the present invention includes a tripod head which comprises a base platform, a first housing slidably mounted on the platform to permit the first housing to move along a first directional path, and a second housing slidably mounted within the first housing to permit the second housing to move along a second directional path, generally orthogonal to the first directional path. Mounted pivotally within the second housing is a gimbal which includes a central cavity for receiving the shaft of the monopole. The gimbal allows the angular position of the monopole and GPS antenna to be adjusted independently of the angular position tripod platform.

17 Claims, 10 Drawing Sheets

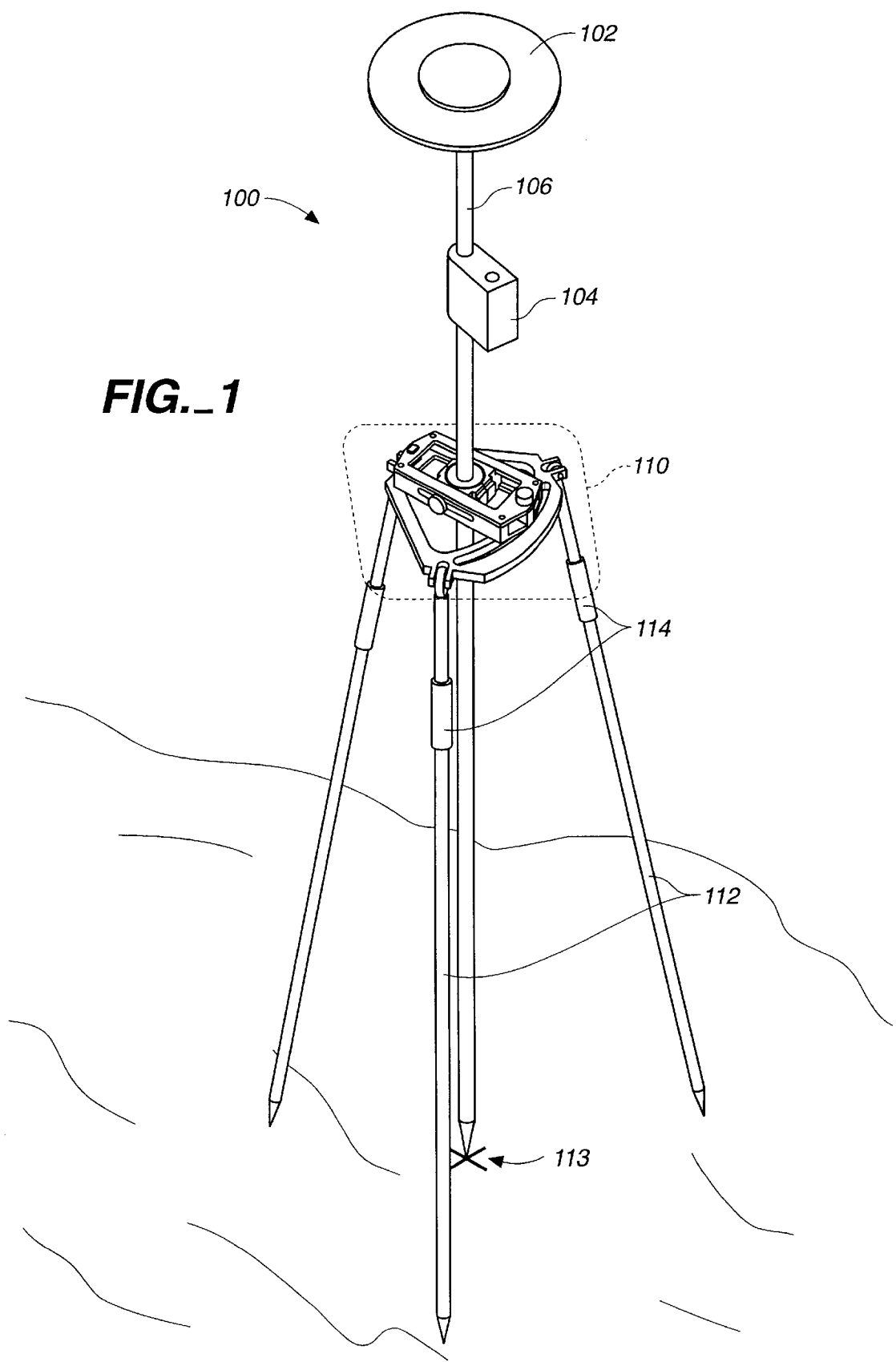
FIG._1

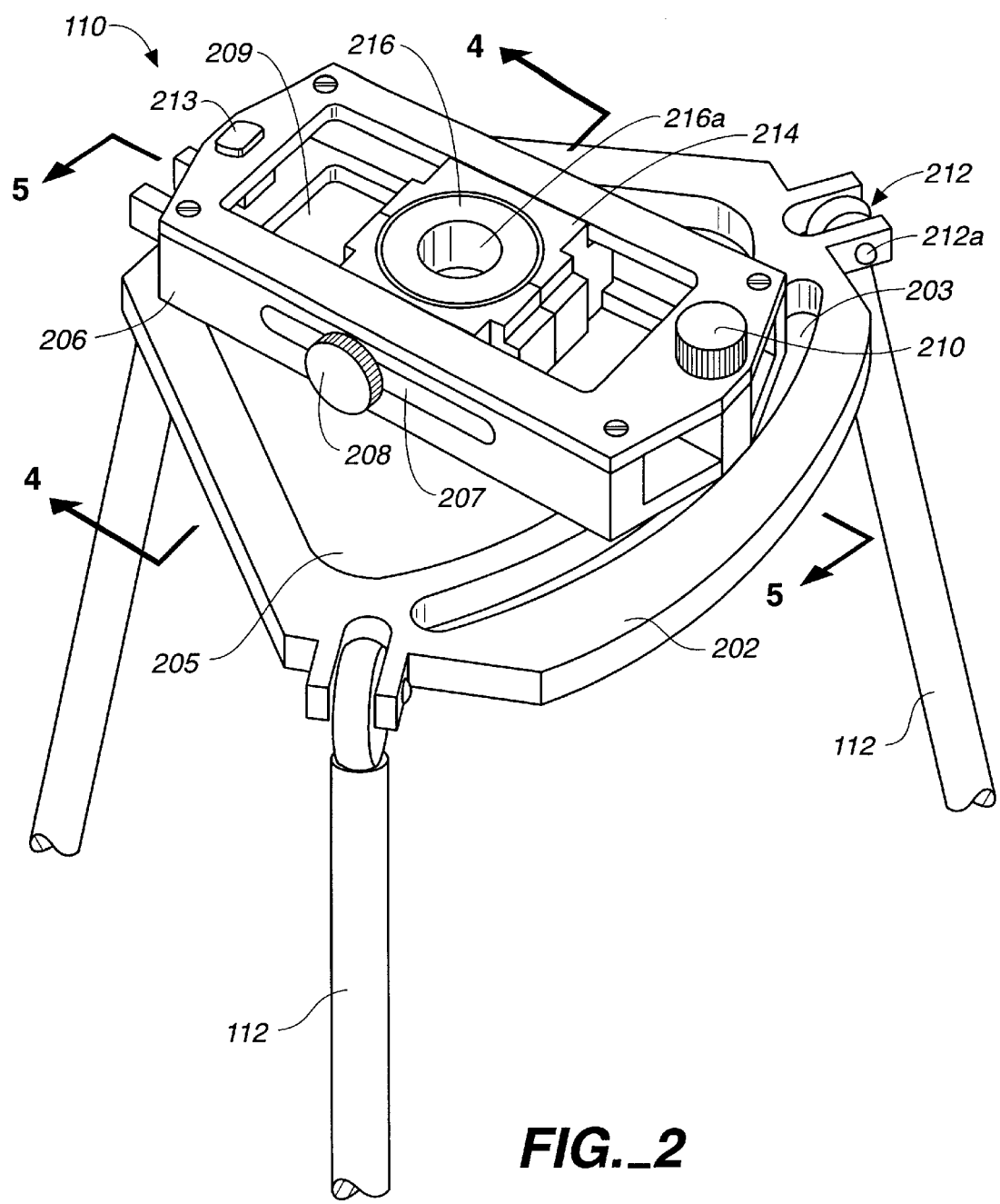
FIG._2

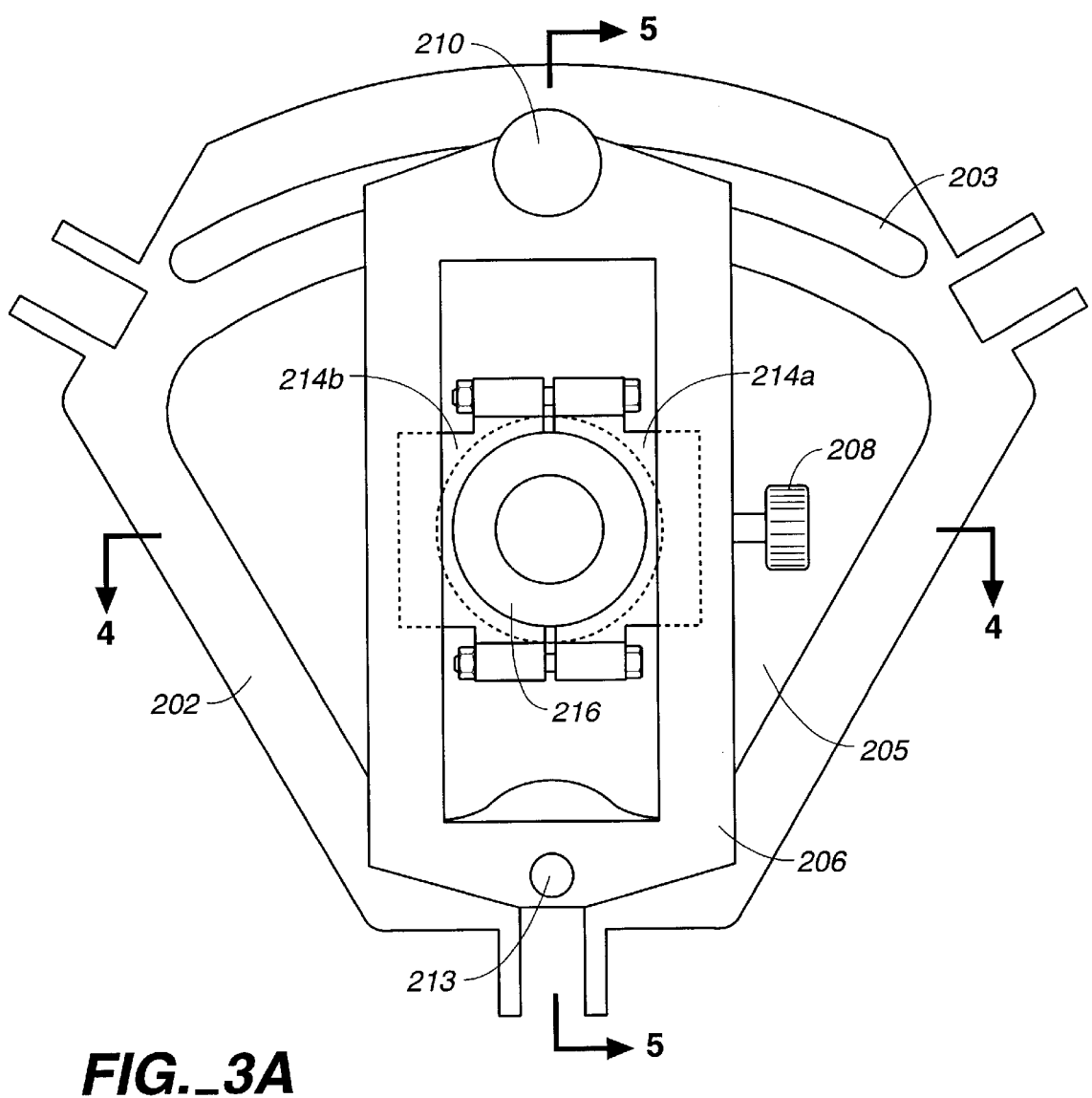
FIG._3A

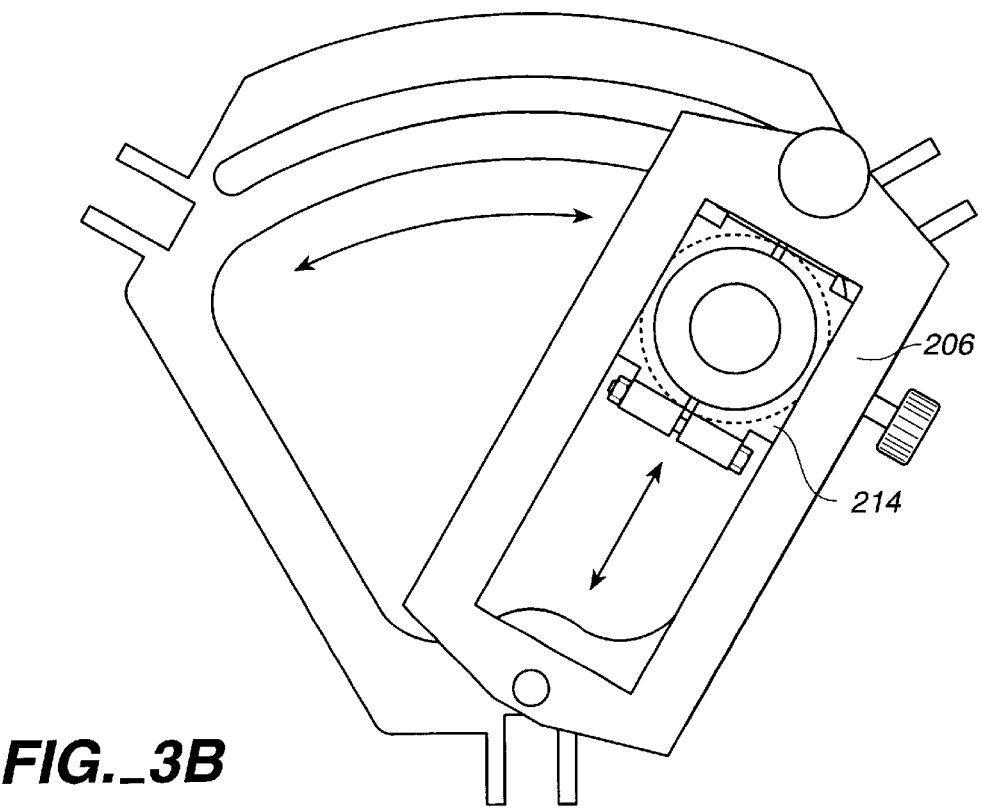
FIG._3B
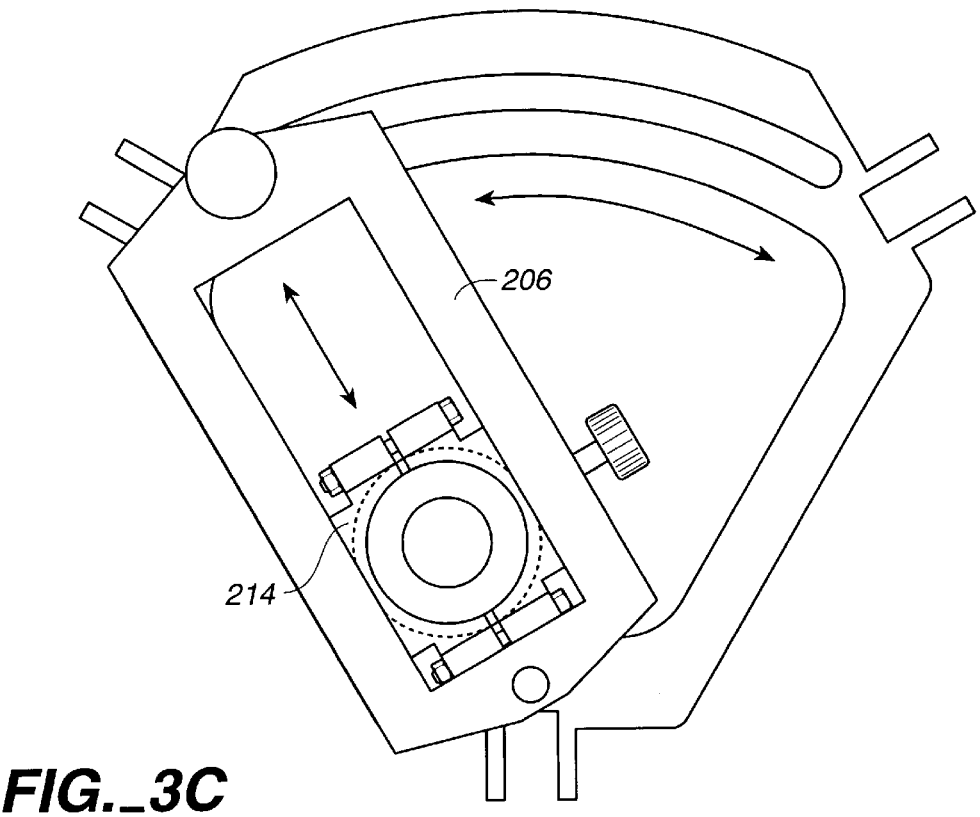
FIG._3C

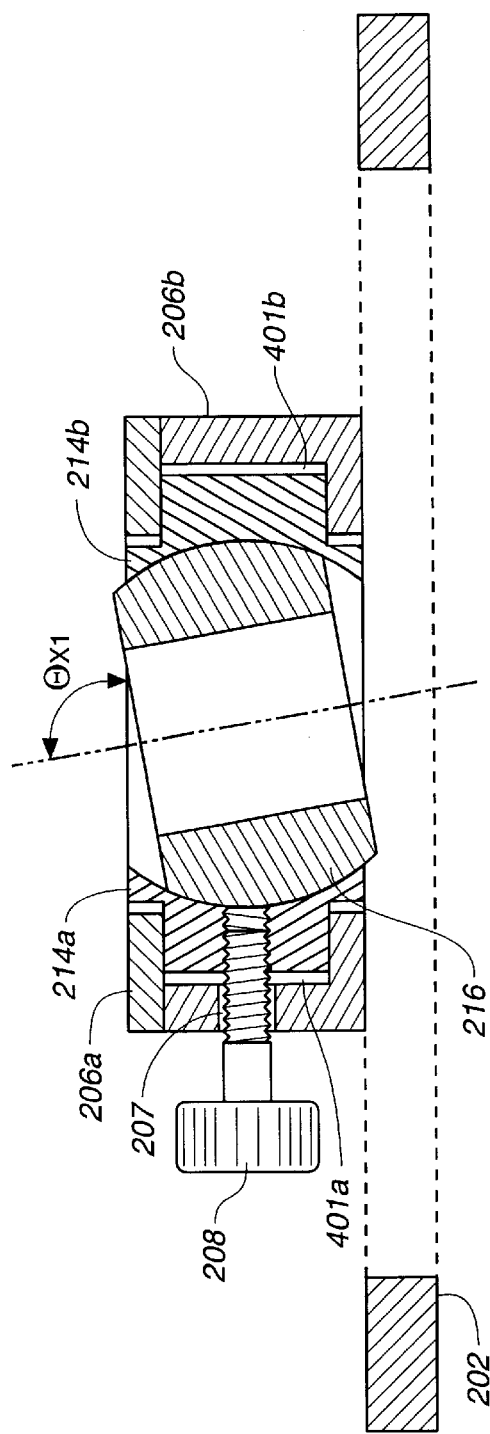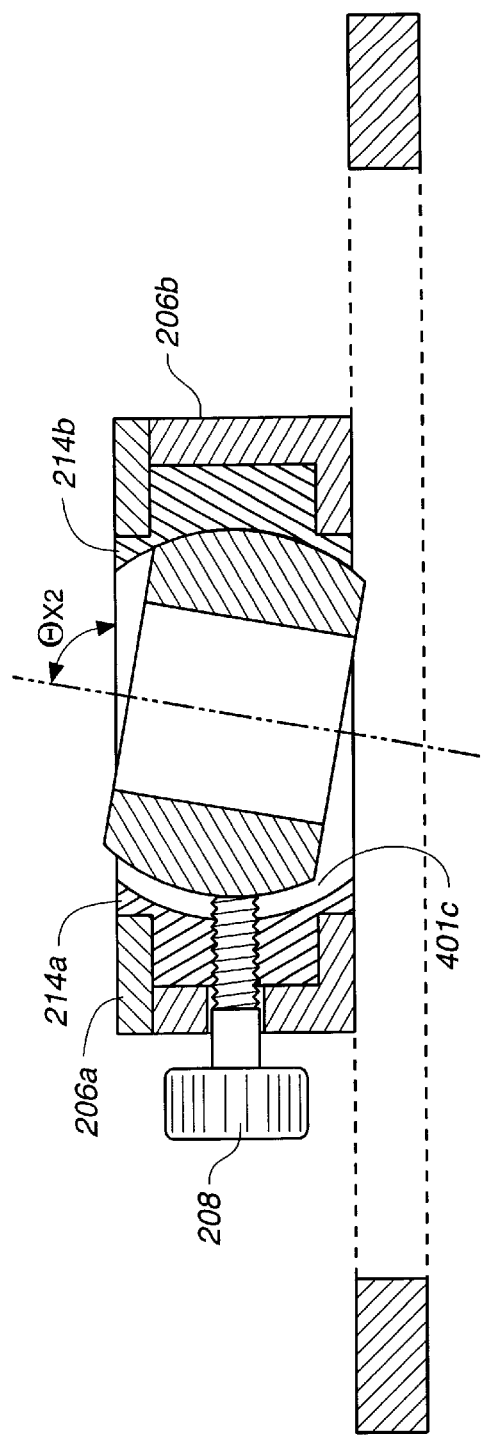
FIG._4A   FIG._4B

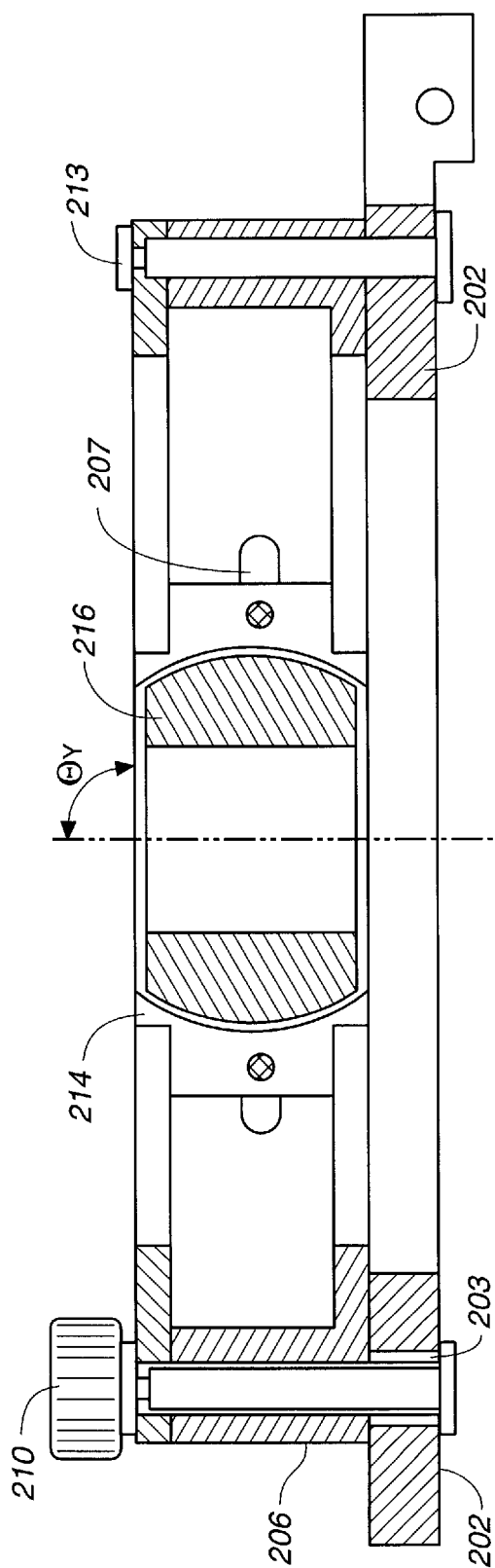
*FIG._5*
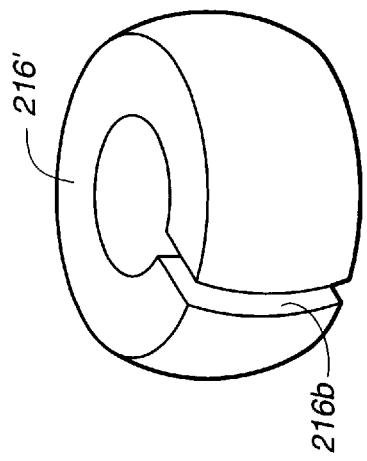
*FIG._6A*
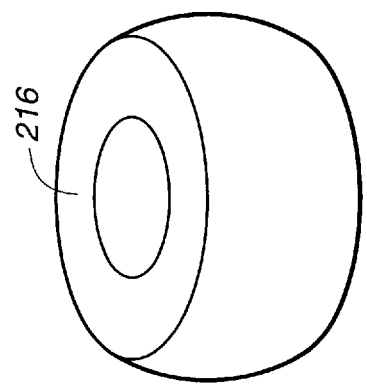
*FIG._6B*

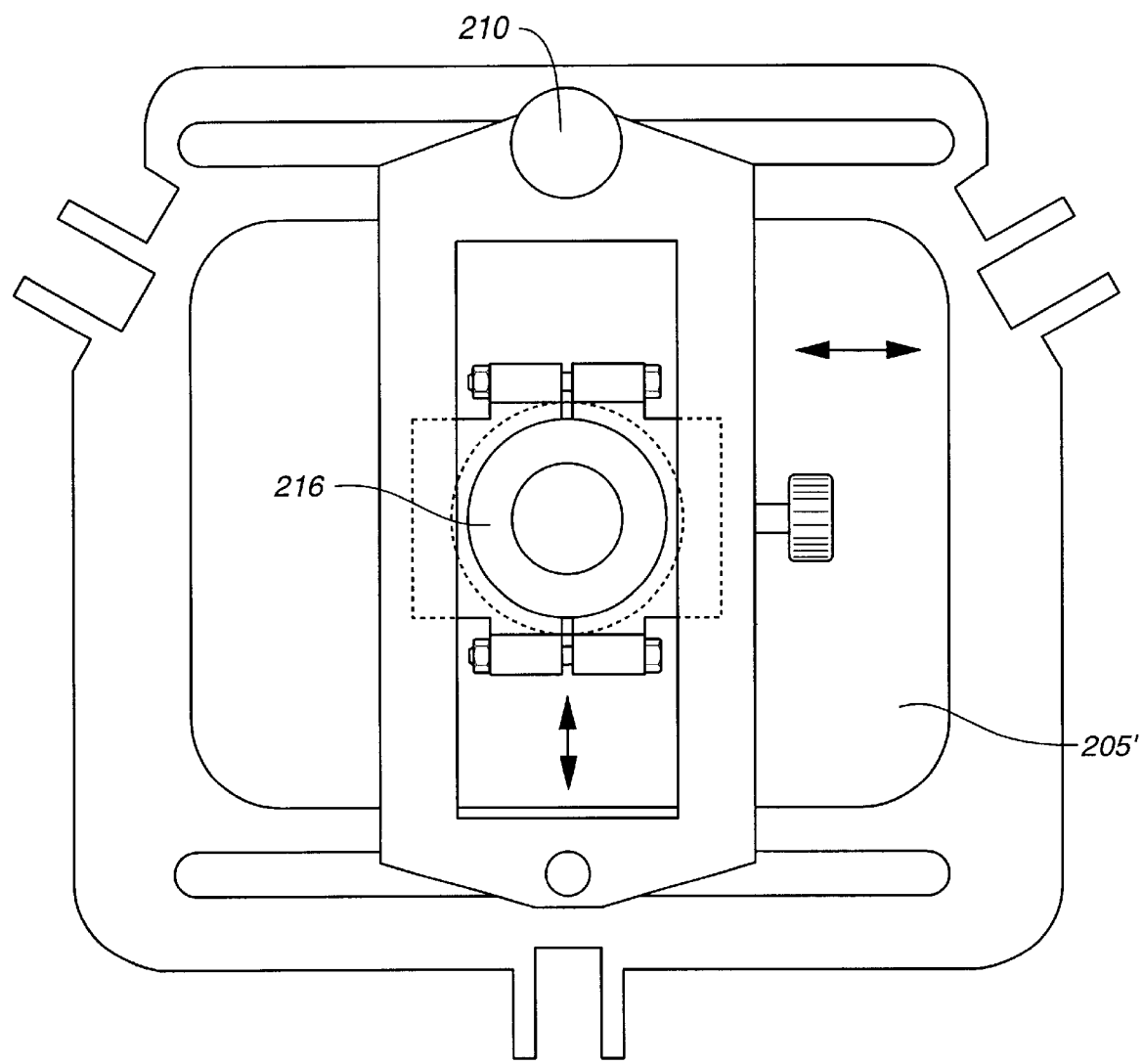
FIG._7

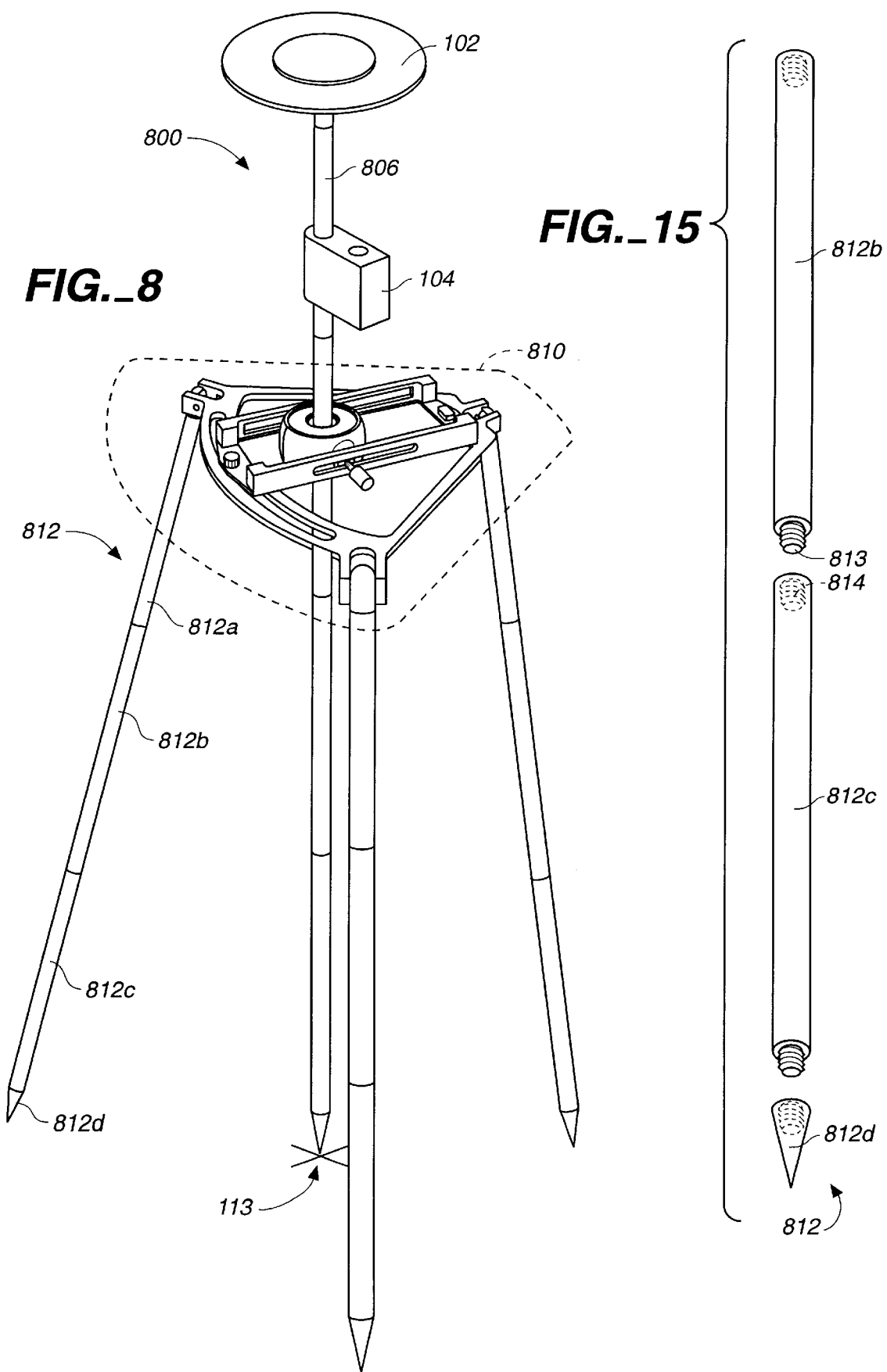

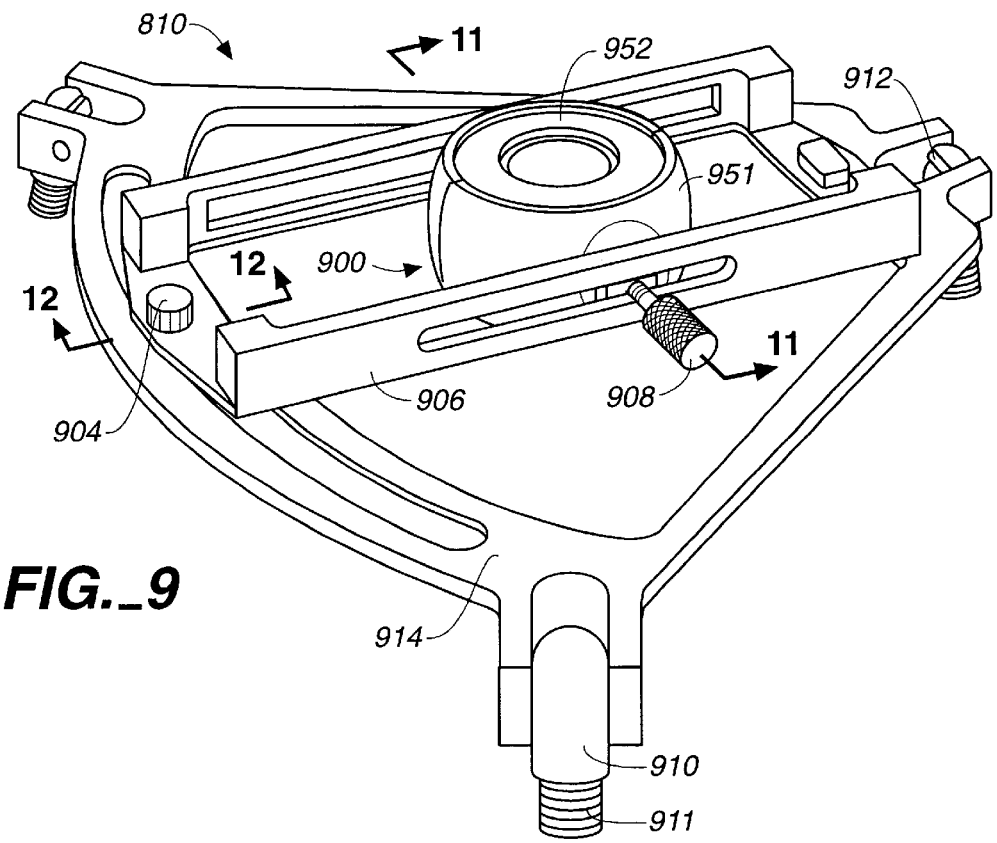
FIG._9
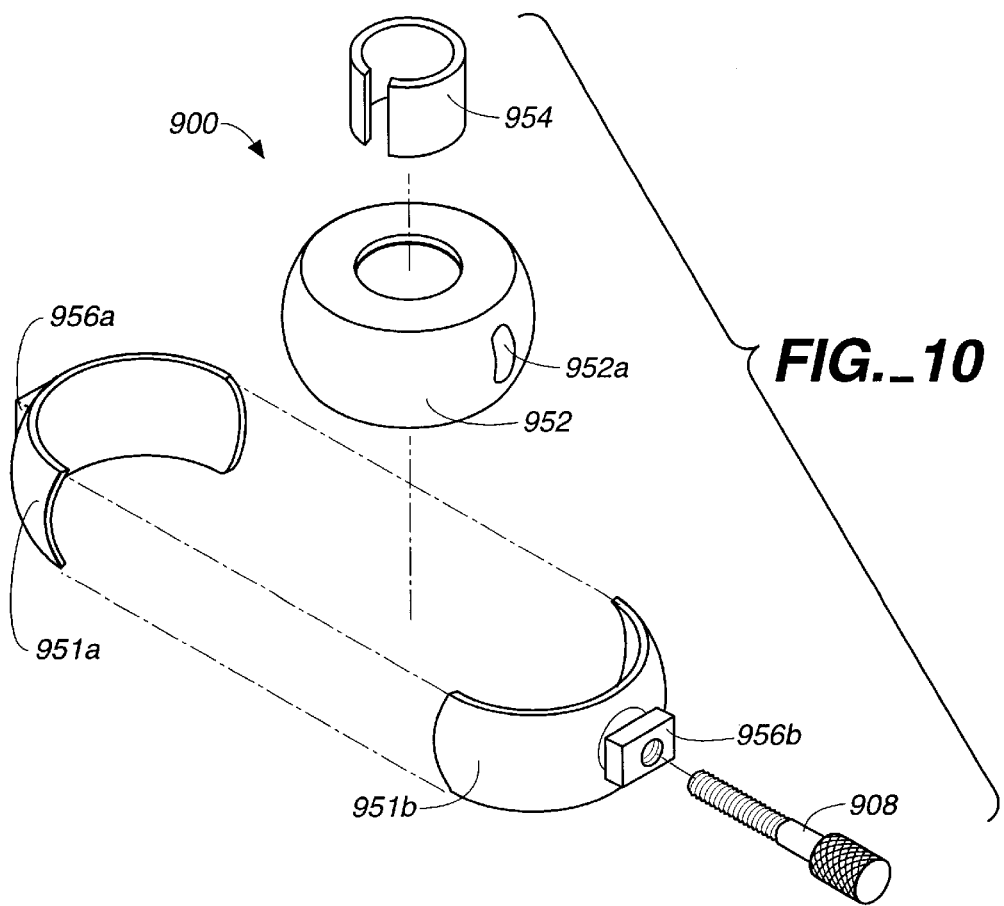
FIG._10

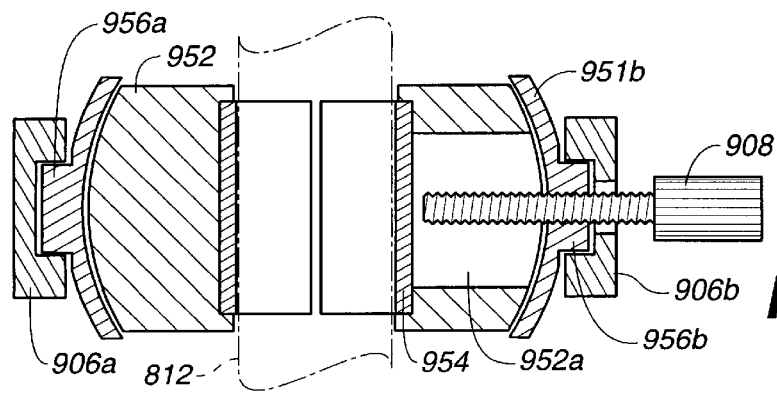
FIG._11
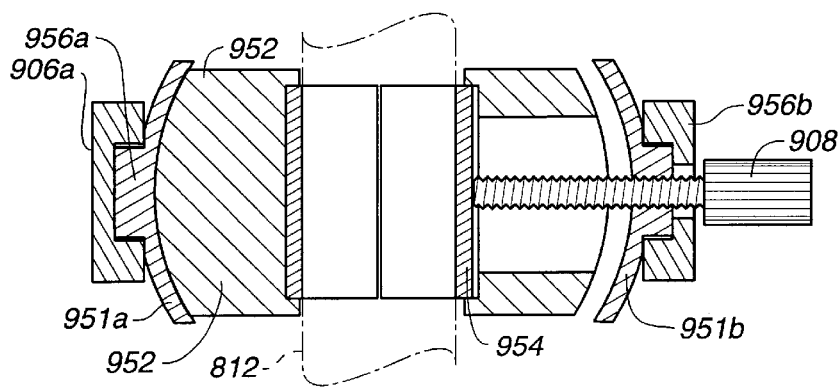
FIG._11A
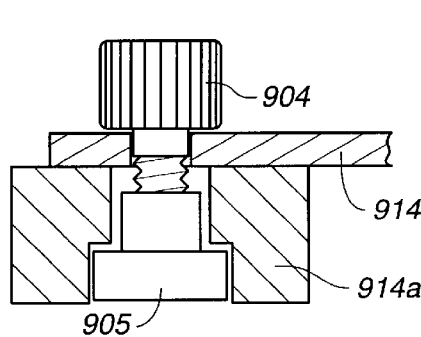
FIG._12
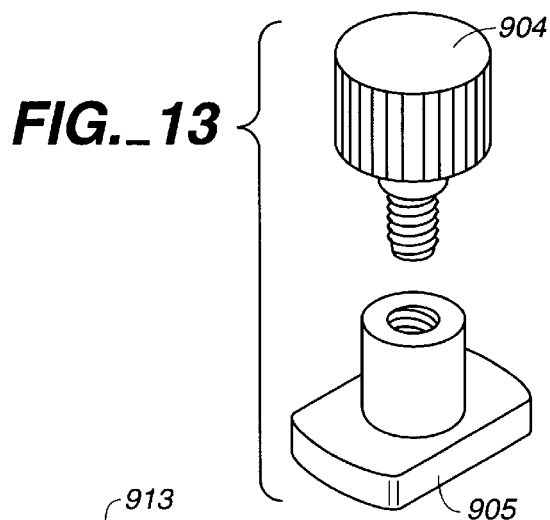
FIG._13
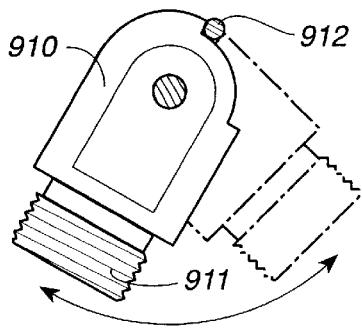
FIG._14
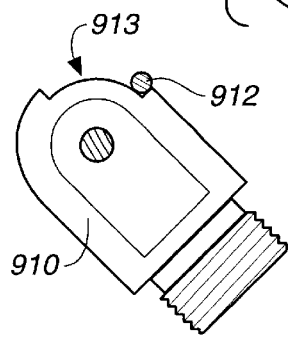
FIG._14A

KNOCK-DOWN SATELLITE POSITIONING SYSTEM ANTENNA SUPPORTING TRIPOD

CROSS-REFERENCE TO RELATED APPLICATION

This is a continuation-in-part patent application of parent application Ser. No. 08/578,169, filed Dec. 29, 1995, entitled "Satellite Positioning System Antenna Supporting Tripod," hereinafter referred to as the "parent application."

BACKGROUND OF THE INVENTION

The present invention relates generally to positioning any instrument accurately and quickly over a desired location or holding a monopod accurately and quickly in a vertical and stable position over a desired mark and, more particularly, to an improved surveyor's tripod for facilitating geodetic surveying using satellite positioning systems.

Traditionally, a geodetic surveyor uses several types of instrument supporting techniques for different applications. Such techniques include:

1. Rod man set up,
2. Instrument tripods, and
3. Fixed length monopoles with two or three adjustable length legs.

Each of the above techniques will be discussed in greater detail in the next three sections.

Rod Man Set Up

The rod man set up utilizes the help of a rod man whose function it is to hold a rod precisely vertical at a specific location upon the ground. Unless the rod is maintained precisely vertical, errors will be introduced in the readings taken. Relatively modern surveying equipment includes the use of a prism or reflector upon the rod to reflect an emitted beam from the surveying device. Again, accuracy in maintaining the rod stationary and vertical during the taking of the readings is of paramount importance. However, due to fatigue or difficult terrain, a rod man may have difficulty in maintaining a rod immobile and vertical for a sufficient period of time to obtain an accurate reading, which reading may require thirty seconds to five minutes or more. Even the most conscientious rod man will inadvertently permit minor oscillations of the rod during a reading. Moreover, during a reading, the rod man is not available to attend other matters, nor is he free to rest.

One solution used in the field to maintain the rod steady and plumbed is that of using a tripod to support the rod. However, the task of setting up and plumbing the tripod so that the surveyor's rod is precisely vertical and over the desired location is often tedious and time-consuming. Often the procedure requires intricate fine tuning of threaded screws to adjust the rod into a desired position. For example, U.S. Pat. No. 4,438,896 to Hall discloses a segmented collar tripod for holding a surveyor's stake. The tripod of Hall includes three thumb screws which extend through the collar segments for threadable movement inwardly toward surveyor's stake located within the central opening of the tripod head. In order to adjust the position of the rod, each of the thumb screws must be manually rotated, often a number of times, until finally the rod is positioned precisely vertical and directly over the desired location.

Instrument Tripods

Instrument tripods were originally used to hold optical survey instruments like theodolites, and electronic distance measurement (EDM) devices in a precise and stable position directly over a survey mark. In more recent times they are also used in satellite positioning systems for holding the antenna of a satellite positioning system at a precise location over a desired mark to be surveyed.

The conventional procedure for using such tripods for performing geodetic surveying involves setting up the instrument of GPS antenna precisely over the survey mark at a measurable height. This is done by setting a tripod directly over the desired ground location, adjusting the top platform of the tripod so that it is absolutely level, mounting an instrument or GPS antenna onto the center of the tripod platform, measuring the vertical height from the ground location to the GPS antenna, taking readings of the positional coordinates of the GPS antenna, and calculating the positional coordinates of the ground location based upon the coordinates of the GPS antenna and the height of the antenna above the ground location. A more detailed explanation of this procedure is described immediately below.

First, a surveyor's tripod is placed over a desired location on the Earth's surface. An optical tribrach is then mounted upon the tripod in order to precisely align the top of the tripod over the desired location. In performing this task, the surveyor is required to peer into a viewing window on the tribrach, which shows the area of ground directly under the tripod. With his eye to the eyepiece, the surveyor then adjusts the lateral position of the tribrach so that the crosshairs shown in the viewing window (which represent the center of the tribrach) are aligned directly over the desired location on the ground. Lateral (or horizontal) adjustment of the tribrach is typically accomplished by rotating a plurality of fine tuning screws which incrementally adjust the position of the tribrach body relative to the tripod along a horizontal plane. After the horizontal position of the tribrach has been adjusted, the surveyor is then required to precisely level the top platform of the tribrach so that the GPS antenna, which is to be placed upon the top portion of the tribrach, is level. It is important that the GPS antenna be level; otherwise, errors in the GPS measurements may occur.

Furthermore, because the adjustable range of the tribrach is limited, it is important that the top platform of the tripod be substantially level during initial setup of the tripod over the desired location. If the angular position of the tripod platform is too extreme, the range of adjustable motion of the tribrach will be insufficient to allow the surveyor to level the top surface of the tribrach platform. Thus, for various types of ground surface conditions, the surveyor will be required to adjust the length of the respective tripod legs in order to first place the tripod platform in a substantially level position.

As with the horizontal positioning, the leveling of the tribrach is accomplished by rotating a plurality of fine tuning screws which incrementally adjust the positioning of the top surface of the tribrach platform. After the center of the tribrach platform is positioned directly above the desired location and leveled, the GPS antenna is then mounted upon the center portion of the tripod platform. A conventional tribrach is shown, for example, in U.S. Pat. No. 4,244,547 to Kooi.

After the GPS antenna and tripod have been positioned directly above the desired ground location, the surveyor is then required to measure the vertical distance between the ground point location and the GPS antenna, in order to accurately determine the positional coordinates of the ground point location. Because the legs of the tripod may be adjusted in length from location to location, the height of the GPS antenna will vary at each respective survey point. This continually changing variable complicates the procedure for determining the precise positional coordinates of each respective ground location, and is therefore undesirable.

Typically it takes an experienced surveyor five to ten minutes to set up a GPS antenna and supporting tripod over a desired location, in accordance with the steps described above. Since a large number of data points typically need to be collected for geodetic surveying, the cumulative time spent in setting up the tripod and GPS antenna over each desired location becomes quite significant.

Fixed Length Monopole with Adjustable-Length Legs

This system is conventionally used for GPS applications. The antenna is mounted on top of a fixed length monopole. The monopole is attached to two legs whose length can be adjusted. In this system the tip of the monopod is put on top of the survey mark and the lengths of the legs are adjusted until the monopod is in a vertical position. The process of adjusting the length of the legs is tedious and the system also is not very stable. Since the legs have adjustable mechanisms, they are not as sturdy and stable as fixed length solid legs. The spring mechanism inside the legs and telescopic construction of the legs makes the legs relatively unsturdy. As a result, a minimal pressure or wind can easily move the legs a few millimeters, which results in positional reading errors.

One objective of the present invention, therefore, is to provide a fast and stable technique for accurately positioning of all instruments in general, and satellite positioning antenna in particular, in all applications including performing geodetic surveying using a satellite positioning system. Another objective of the present invention is to eliminate the need for leveling the base of the tripod platform. Another objective is to provide a set up mechanism which is independent of the angular position of the tripod platform. A further objective of the present invention is to provide a stable tripod that is easy and fast to set up for GPS geodetic applications. An additional objective of the present invention is to provide a geodetic survey tripod which can be quickly and easily set up to support a surveyor's stake in a vertical position over a desired ground location.

SUMMARY OF THE INVENTION

These and additional objectives are accomplished by the various aspects of the present invention, wherein briefly, according to a principal aspect, a knocked-down, portable geodetic surveying station adapted to be assembled on-site is provided which utilizes a GPS antenna attached to the top portion of a surveyor's stake, or other type monopod. The monopod and tripod legs may be assembled by joining together sectional pole members, wherein each sectional pole member has a fixed, predetermined length. By positioning the bottom portion of the monopod directly upon a desired ground location, and adjusting the angular position of the monopod so that it is precisely vertical, the GPS antenna may be quickly and accurately positioned level and directly above the desired ground location. Additionally, because the monopod may be assembled to have a known, fixed length, the height of the GPS antenna above the desired ground location may be kept constant, so as not to vary from one survey point to the next.

In order to minimize errors introduced by persons handling the rod and antenna during survey readings, the GPS antenna and monopod are designed to be used in conjunction with a newly designed geodetic surveying tripod which can be quickly and conveniently assembled and set up to support the monopod in its vertical position directly above the desired ground location. The tripod of the present invention includes a tripod head which comprises a base platform, a first housing slidably mounted on the platform to permit the first housing to move along a first directional path, and a second housing slidably mounted within the first housing to permit the second housing to move along a second directional path, generally orthogonal to the first directional path. Mounted pivotally within the second housing is a gimbal which includes a central cavity for receiving the shaft of the monopod. The gimbal allows the angular position of the monopod and GPS antenna to be adjusted independently of the angular position tripod platform.

Once the monopod is aligned in the precisely vertical direction (which, in turn, means that the GPS antenna is precisely level), the lateral position of the monopod and GPS antenna may be conveniently positioned directly above the desired ground location by simply sliding the first and second housings back and forth until the monopod and GPS antenna are aligned directly above desired ground location. The tripod head also includes two locking screws for locking the lateral and angular positions of the monopod and GPS antenna. A first locking screw locks the position of the first housing relative to the base platform of the tripod head. The second locking screw simultaneously locks (1) the angular position of the gimbal (and therefore also the monopod and GPS antenna), (2) the lateral position of the second housing relative to the first housing, and (3) the vertical position (i.e. height) of the monopod and GPS antenna. This feature is particularly useful for soft ground conditions, where the weight of the monopod and GPS antenna would cause the monopod to sink into the ground, thereby affecting the accuracy of the predetermined height of the GPS antenna.

The portable geodetic survey station of the present invention greatly facilitates the use of performing geodetic surveying using a satellite positioning system. The tripod of the present invention may be quickly and conveniently set up generally over the desired ground point without concern for the angular position of the tripod platform since the technique of the present invention does not require that the tripod platform be substantially level, as does conventional techniques. The monopod with the GPS antenna attached is then inserted through the gimbal of the tripod and adjusted to a directly vertical position by adjusting the angular position of the gimbal in two orthogonal planes. The first and second housings may then be slidably moved to position the vertical monopod (and level GPS antenna) directly over the desired ground location, allowing the bottom tip of the monopod to rest upon the ground surface. The positions of the first housing, second housing, angular position of the gimbal, and vertical position of the monopod are then locked into place by tightening the two thumb-locking screws located on the tripod head.

This simplified procedure of setting up a GPS antenna and supporting tripod is substantially less time-consuming than that of conventional techniques. The technique of the present invention does not require the use of an optical tribrach, nor does it require the tedious fine tuning associated with conventional tribrachs for positioning the GPS antenna level and directly above the desired ground location. Furthermore, the base platform of the tripod head of the present invention does not even need to be near horizontal, as is required by conventional GPS supporting tripods. As a result, the amount of time required to survey a region of land is dramatically decreased. Additionally, the procedure for determining the positional coordinates of the respective ground locations is greatly simplified since the height of the GPS antenna may be made to remain constant from one survey point to the next, unlike conventional techniques. Furthermore, by combining multiple pole sections, the monopod and tripod legs of the present invention may be assembled to be any incrementally desired length to overcome obstructions to GPS satellite signals.

Another advantage of the present invention is that the entire survey station may be conveniently disassembled (i.e. knocked-down) and reassembled on-site. Thus, once the station 800 has been knocked-down to its kit form, the entire station may be conveniently transported to the survey sight, whereupon it may then be easily reassembled on-site. Additionally, the station, when knocked-down, takes up substantially less space, which facilitates both storage and shipping constraints.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 illustrates a perspective view of the geodetic survey station of the present invention utilizing an SATPS antenna.

FIG. 2 a perspective view of area 110 of survey station 100 of FIG. 1, showing the tripod head of the present invention.

FIG. 3A is a top plan view of the tripod head of the present invention.

FIGS. 3B and 3C are top plan views of the tripod head of the present invention, illustrating the motion of the first and second housings of the tripod head.

FIGS. 4A and 4B illustrate a cross-sectional view of the tripod head taken along the line 4 of FIG. 3A, further illustrating the angular movements of the gimbal as well as the locking mechanism of the thumb screw.

FIG. 5 illustrates a side view of the tripod head of the pre invention taken along the line 5 of FIG. 2.

FIG. 6A illustrates a perspective view of one embodiment of the gimbal 216 of the present invention.

FIG. 6B illustrates a perspective view of an alternate embodiment of the gimbal of the present invention.

FIG. 7 illustrates an alternate embodiment of the tripod head 110 of the present invention.

FIG. 8 illustrates a perspective view of an alternate embodiment of the geodetic station 800 of the present invention.

FIG. 9 shows a perspective view of area 810 of survey station 800 of FIG. 8, showing an alternate embodiment of the tripod head of the present invention.

FIG. 10 shows an exploded view of the second housing and gimbal device 900 of FIG. 9.

FIGS. 11 and 11A illustrate a cross-sectional view of the second housing and gimbal device taken along the line 11 of FIG. 9, illustrating the relative movements of the various parts of the second housing gimbal device as screw 908 is tightened.

FIG. 12 illustrates a cross-sectional view of the tripod head of FIG. 9, taken along the line 12.

FIG. 13 illustrates a perspective view of thumb screw 904 and threaded receiving member 905.

FIGS. 14 and 14A illustrate an alternate embodiment of the tripod leg hinge 910, illustrating how this hinge works in conjunction with stopping member 912.

FIG. 15 illustrates an exploded view of an alternate embodiment of the tripod leg 812 of FIG. 8.

DETAILED DESCRIPTION OF THE PREFERRED EMBODIMENT

FIG. 1 illustrates the portable geodetic service station 100 of the present invention. The portable station 100 includes a tripod having a newly designed tripod head 110 hingedly connected to a plurality of adjustable support legs 112. The length of each individual support leg may be adjusted by adjusting means 114. The improved tripod of the present invention is used in conjunction with a surveyor's stake or monopod 106 which has a GPS antenna 102 attached to the top portion of the monopod. The monopod defines a longitudinal axis having an angular position $\Theta x$ relative to an x-axis in a horizontal plane, and an angular position $\Theta y$ relative to a y-axis in the horizontal plane.

As commonly known to those skilled in the art, a satellite positioning system (SATPS), such as the global positioning system (GPS) or the global orbiting navigation satellite system (GLOSNASS), uses transmissions of coded digital signals from a plurality of Earth-orbiting satellites to determine positional coordinates (e.g. longitude, latitude, altitude) of ground locations on Earth.

When performing geodetic surveying using a GPS antenna (or other SATPS antenna), it is important that the antenna be placed directly over the desired ground location to be surveyed (shown in FIG. 1 as location 113). Additionally, it is important that the antenna be absolutely level so that errors related to the positional coordinates of the antenna and ground location are minimized. For this reason, the center of the GPS antenna 102 is attached to the center of the monopod 106. Additionally, the GPS antenna is attached perpendicular to the longitudinal axis of the monopod, so that when the monopod is adjusted to an absolute vertical position, the GPS antenna will be completely level. In order to provide assistance in positioning the monopod into a precisely vertical position, a level 104 is releasably attachable to the monopod which will indicate to the user when the monopod is in its precisely vertical position.

FIG. 2 illustrates a perspective view of tripod head 110 of the surveyor's station 100 of FIG. 1. A top view of the embodiment 110 of FIG. 2 is shown in FIG. 3A. The tripod head 110 includes a base platform 202 hingedly connectable to a plurality of support legs 112. The center of the platform defines a central opening 205, which provides a relatively large area by which the monopod can be laterally moved about for positioning the monopod directly over the desired ground location 113. In one embodiment, for example, the total area of the opening 205 may measure approximately 500 sq. cm.

Pivotally mounted upon platform 202 is a first housing 206. Housing 206 is pivotally attached to the platform at pivot 213. The other end of the housing is slidably attached to the platform by means of a thumb tightening screw 210 having a shaft which extends through the body of the first housing and through slot 203 of the platform. The end of the tightening screw shaft on the bottom side of the platform is attached to a nut or other means for allowing the thumb tightening screw to tighten the first housing against the platform as the screw 210 is rotated in a particular direction. This is perhaps best illustrated in FIG. 5, which illustrates a side view of the tripod head of the present invention taken along the line 5 of FIG. 2.

Thus, the first housing 206 is able to pivotally slide along an arcuate path which is substantially parallel to or concentric with the path defined by slot 203. The locking screw 210 functions as both a guiding means for guiding the path of motion of housing 206, and locking means for locking the position of housing 206 relative to the platform 202. This motion is perhaps best illustrated in FIGS. 3B and 3C, which illustrate, among other things, the motion of movement of housing 206 relative to platform 202. After housing 206 has been adjusted into a desired position, the position of housing 206 may be locked by rotating tightening screw 210, which thereby tightens housing 206 against the platform 202.

Disposed within the central cavity 209 of housing 206 is a second housing 214 which is slidably mounted within the cavity of the first housing 206. The path of motion of housing 214 is substantially orthogonal to the path of motion of housing 206. This is perhaps best illustrated in FIGS. 3B and 3C which show the relative motions of both housings 206 and 214.

Pivotally disposed within a central cavity of the second housing is a gimbal member 216. The gimbal member includes a central cavity 216a for receiving the shaft of the monopod. The angular position of the gimbal 216 may be adjusted relative to an x-axis in a horizontal plane and also may be adjusted relative to a y-axis in the horizontal plane, thereby enabling the $\Theta x$ and $\Theta y$ angular positions of the rod or monopod to be adjusted without requiring adjustment of the positions of either the first housing 206 or the second housing 214. Thus, the gimbal mechanism 216 provides the ability of the monopod to be moved to any angular position within a conical volume swept out by pivoting the gimbal and monopod to as near a horizontal position as possible, and rotating the monopod 360° about the pivotal axis of the gimbal. Because of this unique feature, the tripod platform 202 need not be placed in a substantially level position, as is required with conventional tripod's supporting platforms. In fact, the base platform of the tripod head of the present invention does not even need to be near horizontal since the gimbal 216 allows the angular position of the monopod to be adjusted independently of the angular position of the tripod platform head 202.

As shown in FIG. 2, the second housing 214 also includes a thumb tightening screw or locking member 208 which simultaneously locks the angular position of the gimbal 216 and the position of the second housing 214 relative to the first housing 206. The first housing 206 includes a slot 207 on its side for permitting the second housing locking screw 208 to slide back and forth with the second housing 214 as the second housing slides back and forth within cavity 209.

FIGS. 4A and 4B illustrate a cross-sectional view of the tripod head of FIG. 3A, taken along the line 4. FIGS. 4A and 4B help to illustrate the angular movements of the gimbal 216 as well as the function of the locking mechanism of the thumb screw 208. Referring first to FIG. 4A, it can be seen that the second housing 214 is comprised of two separate bodies 214a and 214b. After the gimbal 216 has been inserted within the cavity formed by housing 214, the separate pieces of the housing 214a and 214b are secured together by fastening means such as, for example, by a nut and bolt. An example of the fastening means is illustrated in FIG. 3A.

Returning to FIG. 4A, it can be seen that the gimbal 216 is positioned at a first angle, represented by $\Theta x1$. The tightening screw 208 is shown to extend through slot 207 and into a threaded aperture located within the body of the second housing 214a. While the thumb screw is in its loosened position, as shown in FIG. 4A, the second housing body 214 will have play between it and the first housing 206, which allows the second housing to slide within the channel formed by the first housing. The play between the first housing and second housing is illustrated by gaps 401a and 401b.

In FIG. 4B, the angular position of the gimbal 216 has been adjusted to a new angle represented by $\Theta x2$. After the gimbal 216 and the second housing 214 have been adjusted to their desired positions, the thumb screw 208 is rotated in a tightening direction such that the tip of the thumb screw engages against the surface of the gimbal member 216. As the screw 208 is tightened, force is exerted upon the gimbal member 216 which, in turn, is transferred to second housing body 214b, causing body 214b to be forced against the portion of first housing body represented by 206b. Simultaneously, as screw 208 presses against gimbal 216 in a first direction, the threaded engagement of the screw 208 and second housing body 214a cause the screw to exert a force upon body 214a in a direction opposite to the direction of the force it exerts upon the gimbal. This results in body 214a being forced against first housing body portion 206a, and also results in a small gap 401c forming between body 214a and gimbal 216. In this way the locking screw 208 is able to simultaneously lock the angular position of the gimbal 216 and lock the position of the second housing 214 relative to the first housing by causing the body of the second housing to be pressed firmly against the body of the first housing, as shown in FIG. 4B.

FIG. 6A illustrates one embodiment of the gimbal 216 comprising a convex ring. The shape of the ring 216 is substantially spherical so as to permit it to rotate and/or pivot within the central cavity of second housing 214. Alternatively, as shown, for example, in FIG. 6B, the gimbal may comprise a C-shaped ring 216'. One advantage of using the C-shaped ring 216' as the gimbal member is that, as the tightening screw 208 pushes against the gimbal, the gap 216b of the C-shaped ring will become smaller, causing the ring to tighten upon the monopod inserted through its center. In this way, the tripod head of the present invention provides a unique feature wherein a single tightening screw 208 is able to simultaneously lock: (a) the angular position of the gimbal; (b) the position of the second housing relative to the first housing; and (c) the vertical position of the monopod 106 (and consequently the height of the GPS antenna). This feature is particularly useful when surveying soft ground conditions, where the weight of the monopod and GPS antenna would cause the monopod to sink into the ground, affecting the accuracy of the predetermined height of the GPS antenna.

Another way of securing the vertical position of the monopod and for securing it against rotations is to provide a thin, movable wedge-shaped sleeve around the post so that, after the tripod and monopod have been set up, the sleeve may be pushed down to be inserted between the monopod and gimbal for securing the vertical position of the monopod and for securing the monopod against rotational movement. Additionally, this will keep the monopod centered and not allow it to be pushed in a lateral direction.

It is to be noted that alternate embodiments of the gimbal of the present invention (not shown) may be used without departing from the scope or spirit of the appended claims. For example, instead of a complete spherical ring, the gimbal may comprise several convex pieces connected together, appearing similar to an orange where every other wedge-shaped section has been removed or recessed. Alternatively, cuts or channels may be made in the ring in any direction. This will not only make the ring lighter, but will also result in less friction between the outer surface of the ring and the walls defining the cavity of the second housing since the surface area of the ring contacting the walls of housing 214 will be reduced. Alternatively, instead of a spherical ring, a spherical ball bearing may be used. Moreover, the gimbal member of the present invention is intended to cover any shape or design that can provide free motion to the monopod in at least two dimensions.

Thus, for example, the motion of the spherical ring embodiment of the gimbal can be achieved by other ways such as, for example, by pivotally securing the monopod to a first axis, which permits the monopod to pivot in a first plane, and pivotally attaching the first axis (and monopod) to a second axis, which permits the first axis and monopod to pivot in a second plane orthogonal to the first plane. This embodiment can be achieved in the present invention, for example, by including a thin sleeve around the monopod which includes two substantially cylindrical fingers extending at right angles from the longitudinal axis of the monopod and diametrically opposed from each other. As the monopod is inserted into the cavity of the second housing, the fingers may be received by respective U-shaped receptacles within the cavity, thereby allowing the monopod to pivot along a plane which is orthogonal to the axis created by the two fingers. In turn, the receptacle which holds the fingers may be pivotally connected to the second housing such that the finger receptacle is allowed to pivot about an axis perpendicular to the axis defined by the two fingers. The resulting motion of the monopod will be substantially identical to the motion achieved by using the spherical ring 216.

FIG. 5 illustrates a side view of the tripod head of the present invention taken along the line 5 of FIG. 2. As can be seen in FIG. 5, the first housing 206 is secured to the platform 202 at one end by pivot pin 213, and at the other end by thumb tightening screw 210. Additionally, the second angular position of the gimbal $\Theta y$ is shown. This angular position for $\Theta y$ may be adjusted with respect to the y axis in the same manner as that shown in FIGS. 4A and 4B with respect to $\Theta x$.

FIG. 7 illustrates a top view of an alternate embodiment of the tripod head of the present invention. One of the primary differences between FIG. 7 and FIG. 3, for example, is that the lateral position of the monopod may be adjusted in FIG. 7 by moving the monopod along two perpendicular axes, whereas the lateral position of the monopod of FIG. 3 may be adjusted by moving the monopod in a combined semi-circular and linear motion. In either embodiment, the lateral position of the monopod may be adjusted to anywhere within the central opening 205 or 205' defined by the tripod head platform.

The tripod head of the present invention may be made of any sturdy material, including but not limited to steel, aluminum, PVC plastic, or other sturdy material which can withstand the stresses and extended usage associated with geodetic surveying. Preferably, the material is lightweight such as, for example, aluminum, to reduce the overall weight of the tripod.

The portable geodetic survey station of the present invention greatly facilitates the use of performing geodetic surveying using a satellite positioning system. In performing geodetic survey measurements using the technique of the present invention, the tripod of the present invention may be quickly and conveniently set up generally over the desired ground point without concern for the angular position of the tripod platform since the technique of the present invention does not require that the tripod platform be substantially level, as does conventional techniques. The monopod with the GPS antenna attached is then inserted through the gimbal of the tripod and adjusted to a directly vertical position by adjusting the angular position of the gimbal in two orthogonal planes. The first and second housings may then be slidably moved to position the monopod directly over the desired ground location, allowing the bottom tip of the monopod to rest upon the ground surface. The positions of the first housing, second housing, and angular position of the gimbal are then locked into place by tightening the two thumb-locking screws 208, 210 located on the tripod head.

At this point, reading may be taken using the GPS antenna to determine the positional coordinates of the antenna. From this data, the positional coordinates of the desired ground location may be calculated using the coordinates of the antenna and the height of the antenna above the ground. It is to be noted that the procedure for determining the positional coordinates of the respective ground locations is greatly simplified since the height of the GPS antenna remains constant from one survey point to the next using the technique of the present invention, unlike conventional techniques.

FIG. 8 illustrates a perspective view of an alternate embodiment of the geodetic station 800 of the present invention utilizing an SATPS antenna 102. Survey station 800 incorporates improvements related to simplification of manufacturability of the station, as well as improvements related to reduction of weight, which is of significant importance to the end user since remote survey stations are typically manually transported in the field.

Each of the tripod legs 812 and monopole 806 includes a plurality of individual tubing sections (812a–812c) which are joined together to form a single pole or support leg. FIG. 15 illustrates an exploded view of a portion of the support leg 812 of FIG. 8. It is to be noted that the description of the tripod leg of FIG. 15 may also be used to describe monopole 806 of FIG. 8.

As shown in FIG. 15, tripod leg 812 may comprise one or more individual tube segments which can be joined together to obtain a leg of a desired length. Each of the segments of the tripod leg is detachably connectable to another segment of the tripod leg. The tubing sections may be joined together by mating male screw portion 813 with its corresponding threaded female receptacle 814. It is to be understood that other techniques for fastening together the individual tubing sections may be used which are commonly known to those skilled in the art.

At the end of tubing member 812c is attached a grounding point member 812d. The grounding point member 812d may be used at the end of each of the tripod legs and monopod to help secure each leg to a particular point on the ground, and to prevent each leg from moving as the tripod is set up and used.

The tripod legs and monopole of FIG. 8 offer several advantages over the respective tripod legs and monopole of FIG. 1. First, because the individual segments forming the tripod leg can be detachably connected to each other, the tripod legs and monopole of the survey station may be broken down, and conveniently carried or transported in kit form. Second, because the tripod segments are releasably connectable to one another, multiple sections of the tube segments can be combined to obtain a desired height above the terrain and obstructions to GPS satellite signals. Similarly, the height of the monopole can be adjusted by adding or deleting tubing segments until the GPS antenna is at a position which avoids obstructions of the GPS satellite signals. Additionally, because each of the tube segments are of a known and predetermined length, the exact height of the GPS antenna (and tripod legs) can be quickly and easily determined by multiplying the number of joined segments by the predetermined segment length and adding this value to the length of the grounding point member 812d. An example of a typical installation may be the use of two tube segments per tripod leg, and three or four tube segments for the monopole.

FIG. 9 shows a perspective view of area 810 of the survey station 800 of FIG. 8, showing an alternate embodiment of the tripod head of the present invention. As discussed below in greater detail, some of the differences between tripod platform 810 and that described in the parent application (as illustrated in FIG. 2, for example) are: a re-designed first housing 906 which includes fewer assembled parts than the first housing of the tripod head of the parent application; a re-designed second housing and gimbal device 900 which includes fewer assembled parts than the second housing and gimbal device of the tripod head of the parent application; and a modified tripod leg pivot assembly 910 which includes a pivot stop 912 for allowing each tripod leg to be quickly set up to a predetermined position. Other differences between the tripod head of the present application and that of the parent application are discussed in greater detail below.

FIG. 10 shows an exploded view of the second housing body and gimbal device 900 of FIG. 9. The second housing is comprised of two semi-circular bodies 951a and 951b, which encase the gimbal device 952. Affixed to the end of each side of the second housing is a respective rectangular member 956a and 956b, which fits into a respective channel of the first housing 906 in order to allow the second housing and gimbal device -to slide along the track of the first housing in a manner similar to that described above with respect to first and second housings 206 and 214.

One advantage of the embodiment of the second housing as shown in FIG. 10 is that no assembly screws or other assembly members are needed to hold the second housing in place within the track of the first housing. The second housing 951 is instead secured into place by the frame of the first housing and the mating feature of the rectangular blocks 956a, 956b within their respective slots of the first housing 906.

One of the rectangular members 956b of the second housing includes a threaded through hole for receiving the threaded shaft of thumb screw 908. The gimbal 952 of FIG. 10 is a substantially spherical ring which includes a slot 952a that opens into the center of the ring. Located within the center of the gimbal 952 is a C-shaped ring 954 which receives the shaft of the monopod. Ring 954 may be comprised of metal or plastic or any other suitable, resilient, flexible material.

As with the embodiment of FIG. 2, a single thumb screw, or other locking means, can be used to simultaneously: (1) lock the angular position of the gimbal device; (2) lock the lateral position of the second housing and gimbal device relative to the first housing; and (3) lock the vertical position of the monopod. This feature is described in greater detail in FIGS. 11 and 11A.

FIGS. 11 and 11A illustrate a cross-sectional view of the second housing 951 and gimbal device 952 of FIG. 9, taken along the line 11. In FIG. 11, the thumb screw is in its open position. As illustrated, thumb screw 908 is inserted through an elongated slot of first housing frame 906b, and is threaded into second housing portion 956b, whereupon a portion of the screw extends into slot 952a of gimbal body 952. The slot 952a within gimbal body 952 enables the angular position of the gimbal to be freely adjusted about two axes of rotation, even while the thumb screw 908 is inserted into slot 952a.

With thumb screw 908 in the open position, there is relative play between each of the pieces forming the first and second housing and the gimbal device. This allows the second housing to slide back and forth along the channel defined by the first housing, allows for the angular position of the gimbal device to be adjusted in both an X and Y dimension, and allows for the vertical position of the monopod 812 to be adjusted up and down.

When the thumb screw 908 is in its locked position, as shown in FIG. 11A, for example, it makes contact with C-ring 954, which causes the C-ring to clamp down upon monopod 812, thereby securing the vertical position of the monopod. The C-ring 954 also functions to protect the monopole from being damaged while the thumb screw 908 is tightened. Additionally, as the thumb screw 908 exerts force against C-ring 954, C-ring 954 is caused to exert force upon gimbal body 952 which, in turn, exerts force against second housing member 951a which, in turn, exerts force upon first housing portion 906a. Simultaneously, while thumb screw 908 exerts force against C-ring 954, the threaded engagement of the screw and second housing portion 951b causes the second housing portion 951b to exert force upon first housing portion 956b. These frictional forces between various components of the tripod head inhibit free movement of these components. In this way, the locking screw 908 is able to simultaneously lock the angular position of gimbal 952, the vertical position of the monopod, and the lateral position of the second housing relative to the first housing.

FIG. 12 shows a cross-sectional view of the tripod platform 810 taken along the line 12 of FIG. 9. This view shows the assembly of locking device 904. FIG. 13 illustrates a perspective view of locking screw 904 and its corresponding threaded receptacle member 905. As shown in FIG. 12, tripod base platform 914 includes a channel portion on its underside defined by body 914a. The threaded receptacle member 905 is shaped to fit within the channel, allowing play on either side so that member 905 may slide within the channel as the first housing is moved along its arcuate path. It is noted that member 905 is shaped so that it cannot turn or rotate while thumb screw 904 is being tightened.

FIGS. 14 and 14A illustrate the tripod leg pivot assembly which is pivotally attached to base platform 914 of FIG. 9. The assembly includes a hinged member 910 having an elongated notch 913 therein. The hinged member 910 is pivotally connected to base platform 914. One end of member 910 includes a threaded connector 911 for allowing tripod leg segments to be detachably secured thereto. The assembly additionally includes a restrictive stop rod 912 cooperating with groove 913 to thereby restrict the pivotal motion of member 910. Rod 912 functions as a stop to restrict the motion of the tripod leg to a maximum, fixed outward position. This results in each tripod leg having a predetermined, fixed outer stop for facilitating quick set-up of the survey station. Additionally, this feature improves stability of the tripod platform.

Another advantage of the embodiment of survey station 800 is that the entire station may be conveniently disassembled (i.e. knocked-down) and reassembled on-site. Thus, once the station 800 has been knocked-down to its kit form, the entire station may be conveniently transported to the survey sight, whereupon it may then be easily reassembled on-site. Additionally, the station, when knocked-down, takes up substantially less space, which facilitates both storage and shipping constraints.

It is to be noted that while the present application explains the invention using GPS antenna applications as an example, the scope of application is not limited to GPS geodetic applications. The tripod of the present invention may also be used to hold a surveyor's stake, and optical plummet, a camera, or other instruments which require positioning at a particular location above the ground.

Although several preferred embodiments of this invention have been described in detail herein with reference to the accompanying drawings, it is to be understood that the invention is not limited to these precise embodiments, and that various changes and modifications may be affected therein by one skilled in the art without departing from the scope or spirit of the invention as defined in the appended claims.

What is claimed is:

1. A knocked-down portable survey station in kit-form adapted to be assembled on-site for geodetic surveying comprising:

a surveyor's stake having an upper end and a lower end, said stake comprising a plurality of sections, each of said sections including means for releasably attaching a first section to a second section;

a satellite positioning system antenna releasably attachable to the upper end of said stake; and a tripod having a tripod head and at least three legs releasably and hingedly attachable at their upper ends to said tripod head, each of said legs comprising at least one of said plurality of sections;

said tripod head including:
      a base platform releasably attachable to said tripod legs; and
      a base positioning assembly movably attached to said platform for providing a pivot assembly at least two dimensional freedom of motion in a planes said base positioning assembly comprising a first housing slidably mounted on said platform to permit said first housing to move along a first directional path, and a second housing slidably mounted to said first housing to permit said second housing to move along a second directional path which is different from said first directional path;
      said pivot assembly pivotally being attached to said base positioning assembly for providing at least partial freedom of rotation about at least two orthogonal axes, said pivotal assembly includes a gimbal pivotally mounted to said second housing to permit said gimbal to pivot about both an x-axis and a y-axis, said gimbal including a central cavity for receiving said stake.

2. The station of claim 1 wherein each of said plurality of sections has a fixed and predetermined length.

3. A The station of claim 1 further including a plurality of grounding point members releasably attached to the lower end of said stake and to a bottom end portion of each of said tripod legs.

4. The station of claim 1 further including a level releasably attachable to said stake for providing readings related to an angular position of said stake.

5. The station of claim 1 further comprising a first locking screw for simultaneously, releasably locking a position of said second housing relative to said first housing and locking an angular position of said gimbal.

6. The station of claim 5 wherein said first locking screw further simultaneously releasably locks a vertical position of said stake.

7. The station of claim 1 wherein said base platform includes, a plurality of tripod leg mounting assemblies hingedly connected to said platform, each of said mounting assemblies being releasably attachable to a respective tripod leg, each of said mounting assemblies including stop means for restricting motion of a respective tripod leg to a maximum, fixed outward position.

8. The station of claim 7 wherein said stop means comprises a rod cooperating with a notch in said mounting assembly in a manner to restrict pivotal motion of said mounting assembly.

9. A tripod assembly comprising:

a tripod head, said tripod head including:
      a base platform securable to a support means for supporting said platform at a fixed position above a surface; and
      a base positioning assembly movably attached to said platform for providing a pivot assembly at least two dimensional freedom of motion in a plane, said base positioning assembly comprising a first housing slidably mounted on said platform to permit said first housing to move along a first directional path, and a second housing slidably mounted to said first housing to permit said second housing to move along a second directional path which is different from said first directional path;
      said pivot assembly including a gimbal pivotally mounted to said second housing to permit said gimbal to pivot about both an x-axis and a y-axis, said gimbal including a central cavity for receiving a stake;
      said base platform including a plurality of tripod leg mounting assemblies hingedly connected to said platform, each of said mounting assemblies being releasably attachable to a respective tripod leg, each of said mounting assemblies including stop means for restricting motion of a respective tripod leg to a maximum, fixed outward position.

10. The tripod assembly of claim 9 wherein said stop means comprises a rod cooperating with a notch in said mounting assembly in a manner to restrict pivotal motion of said mounting assembly.

11. The tripod assembly of claim 9 wherein said support means comprises a plurality of tripod legs, each of said legs including at least one of a plurality of sectional members, each of said sectional members being releasably attachable to other sectional members;

wherein an upper portion of each tripod leg is releasably attachable to a respective tripod leg mounting assembly.

12. The tripod assembly of claim 11 further including a ground spike member releasably attachable to a bottom portion of each of said tripod legs.

13. A method for performing geodetic surveying using a knocked-down portable survey station in kit-form adapted to be assembled on-site, said method comprising the steps of:

(a) assembling a plurality of sectional members together to form a plurality of tripod legs and a monopole;

(b) mounting a satellite positioning system antenna onto a top portion of the monopole;

(c) attaching each of the plurality of tripod legs to a respective mounting assembly on a tripod base to thereby form a tripod;

(d) positioning said tripod generally over a desired spot on the ground, said tripod base including a base platform, a first housing slidably mounted on said platform to permit said first housing to move along a first directional path, a second housing slidably mounted within said first housing to permit said second housing to move along a second directional path which is different from said first directional path, and a gimbal pivotally mounted within said second housing to permit said gimbal to pivot about both an x-axis and y-axis, said gimbal including a recess for receiving said monopole;

(e) inserting said monopole through said gimbal recess; and (f) adjusting the position and angle of the monopole to ensure that said antenna is level and located at a predetermined height directly above said spot.

14. The method of claim 13 including the step of extending each of said tripod legs outward until it reaches a fixed stop.

15. The method of claim 13 further including the steps of:

locking the position of said first housing relative to said platform by tightening a first screw located on said tripod head; and simultaneously locking the position of said second housing relative to said first housing and locking the angular position of said gimbal by tightening a second screw located on said tripod head; and wherein said adjusting step includes the steps of:
adjusting a lateral position of said monopole by sliding said first and second housings; and
adjusting an angular position of said monopole by pivoting said gimbal.

16. The method of claim 15, wherein said simultaneous locking step further includes the step of locking the vertical position of said monopole by tightening said second screw.

17. The method of claim 13 further comprising the steps of:

determining global positional coordinates of said antenna using information derived from a plurality of satellites;

calculating a height of said GPS antenna by determining a number of sectional members forming the monopole, and multiplying said number by a fixed constant representing a fixed, predetermined length of each sectional member; and determining the global positional coordinates of said spot based upon said antenna coordinates and said height of said antenna.

* * * * *

UNITED STATES PATENT AND TRADEMARK OFFICE
CERTIFICATE OF CORRECTION

PATENT NO.  : 5,769,370
DATED       : June 23, 1998
INVENTOR(S) : Ashjaee

It is certified that error appears in the above-indentified patent and that said Letters Patent is hereby corrected as shown below:

Column 5, line 32, change "pre" to --present--.

Column 13, line 31, change "planes said" to --plane, said--.

Column 16, line 10, after "said" delete "GPS".

Signed and Sealed this

Twenty-third Day of March, 1999

Attest:

Q. TODD DICKINSON

Attesting Officer     Acting Commissioner of Patents and Trademarks